US 8,243,595 B2

(12) United States Patent
Gooch et al.

(10) Patent No.: US 8,243,595 B2
(45) Date of Patent: Aug. 14, 2012

(54) PRIORITIZATION OF NETWORK TRAFFIC SENT TO A PROCESSOR BY USING PACKET IMPORTANCE

(75) Inventors: Mark Gooch, Roseville, CA (US); Robert L. Faulk, Jr., Roseville, CA (US); Bruce LaVigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1729 days.

(21) Appl. No.: 11/198,056

(22) Filed: Aug. 5, 2005

(65) Prior Publication Data

US 2007/0030803 A1     Feb. 8, 2007

(51) Int. Cl.
*H04L 12/26* (2006.01)

(52) U.S. Cl. .................................. 370/230; 370/235

(58) Field of Classification Search .................. 370/230, 370/235, 412, 401, 414, 252
See application file for complete search history.

(56) References Cited

U.S. PATENT DOCUMENTS

| 5,664,195 | A * | 9/1997 | Chatterji ...................... 717/178 |
| 6,400,688 | B1 * | 6/2002 | Lau et al. ................... 370/236.1 |
| 6,940,814 | B1 * | 9/2005 | Hoffman ...................... 370/235 |
| 7,512,706 | B2 * | 3/2009 | Anand .......................... 709/240 |
| 2002/0196785 | A1 * | 12/2002 | Connor ......................... 370/392 |
| 2003/0063562 | A1 * | 4/2003 | Sarkinen et al. .............. 370/230 |
| 2004/0151197 | A1 * | 8/2004 | Hui ............................... 370/412 |

* cited by examiner

*Primary Examiner* — Dang Ton
*Assistant Examiner* — Wei Zhao

(57) ABSTRACT

In one embodiment of the invention, a method for prioritizing network packets, includes: comparing a packet with at least one copy rule; and if the packet matches the copy rule, then buffering the packet in a queue. The method further includes: processing the packet after buffering the packet in the queue.

35 Claims, 4 Drawing Sheets

PRIORITIZATION OF NETWORK TRAFFIC SENT TO A PROCESSOR BY USING PACKET IMPORTANCE

TECHNICAL FIELD

Embodiments of the invention relate generally to network systems, and more particularly to an apparatus and method for prioritization of network traffic sent to a processor by using packet importance.

BACKGROUND

A typical network switch (or router) has a hardware-based fast path for forwarding packets, and a software/CPU-based slower path for learning packet addresses and connections. Specifically, a network switch (or router) typically includes dedicated hardware for forwarding network packets at high speed by using forwarding table lookups (e.g., hashing, content addressable memories or CAMS, etc.), and one or more central processing unit (CPU) subsystems that are used to program the forwarding tables. The CPU is also responsible for maintaining network operation by using specific network protocols (e.g., handling route updates, address resolution protocol or ARP queries/replies, Internet Control Message Protocol or ICMP messages, spanning tree related packets, etc.) as well as user interface functionality. Networking protocol packets are necessary in order to keep the network operational and are typically sent for processing to the CPU.

Packets that are sent to a CPU (i.e., packets that are "copied") are typically prioritized into one of a number of CPU queues (typically from 2 to 8 queues). The memory space of the CPU will typically contain these queues that will be serviced in priority order, i.e., packet traffic placed in the highest priority queue will be processed first before processing packet traffic placed in the lower priority queues. Packets in the lower priority queues may even be discarded should the packet rate to the CPU exceed the packet rate which the CPU can actually process. Thus it is important to correctly prioritize packets into the correct CPU queue. Prior solutions to this problem are typically static and are based on simplistic criteria, and as a result, these prior solutions are suboptimal.

Therefore, the current technology is limited in its capabilities and suffers from at least the above constraints and deficiencies.

SUMMARY OF EMBODIMENTS OF THE INVENTION

An embodiment of the invention provides a method of classifying packets into queues based on the importance of the packet to the processor (i.e., CPU). A set of copy rules are used to specify criteria for whether or not the processor needs to receive and process a copy of the packet. The importance is determined by examining the copy rule(s) that is/are triggered when the packet matches one or more copy rules. For example, a copy rule triggers if the packet information in the packet and/or the packet's associated forwarding information match the copy rule. If at least one copy rule triggers (i.e., the packet matches at least one copy rule), then packet is sent to an appropriate CPU queue so that the CPU can process the packet buffered in the queue to the CPU. If the packet does not match any of the copy rules, then the packet is not processed by the processor. The network device hardware will always perform a standard forwarding function on the packet, regardless of whether or not the packet is being copied to the processor.

In one embodiment of the invention, a method for prioritizing network packets, includes: comparing a packet and its associated forwarding information with at least one copy rule; if the packet matches the copy rule, then buffering the packet in a queue to the processor. The method further includes: processing the packet after buffering the packet in the queue. Other steps may be performed by the method.

In another embodiment of the invention, a method for prioritizing network packets, includes: comparing a packet and its associated forwarding information with a set of copy rules; if the packet matches a first copy rule, then buffering the packet in a first queue prior to processing by a first processor; and if the packet matches a second copy rule, then buffering the packet in a second queue prior to processing by a second processor. Other steps may be performed by the method.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
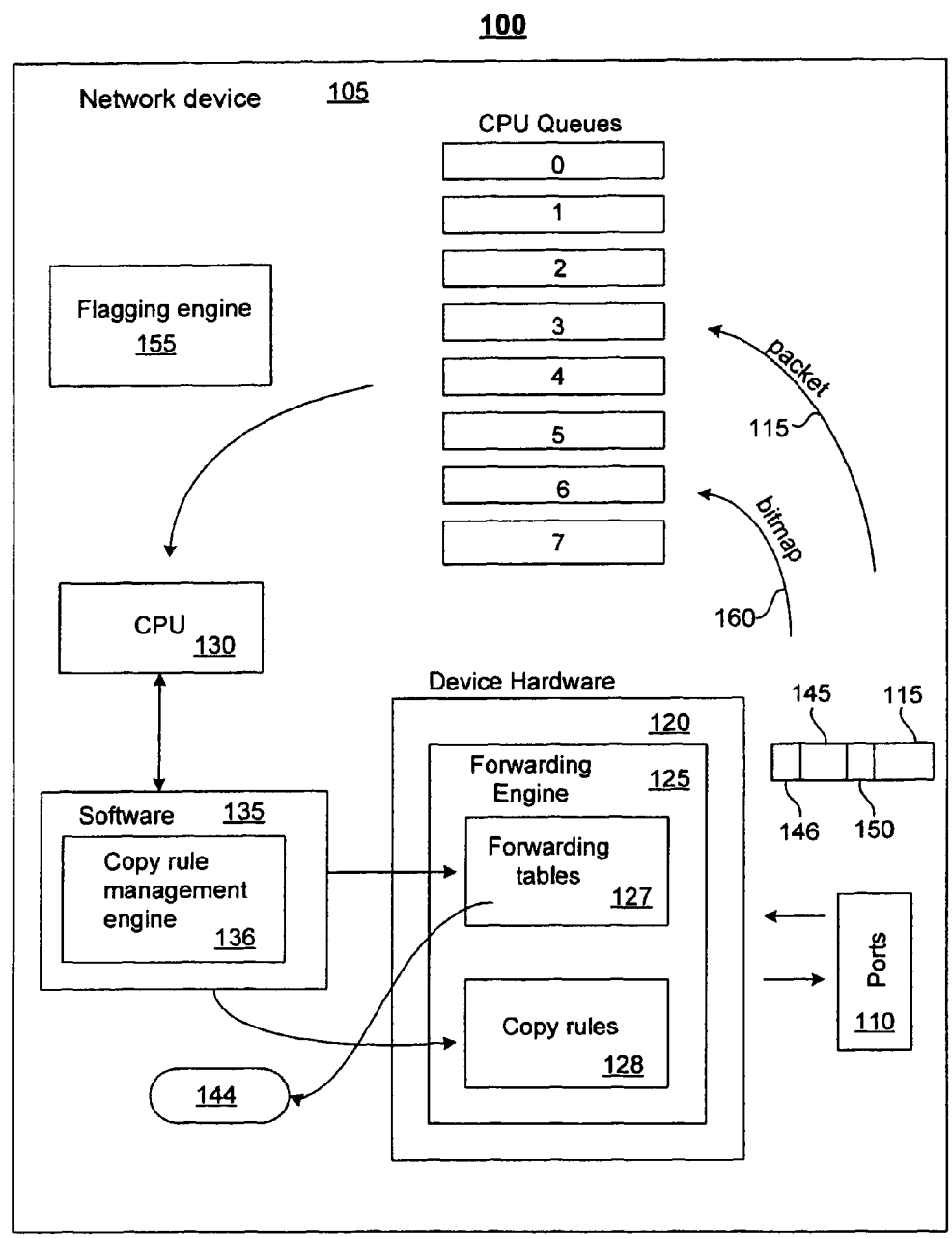
FIG. 1 is a block diagram of a system (apparatus), in accordance with an embodiment of the invention.

FIG. 1 is a block diagram of a system (apparatus) 100, in accordance with an embodiment of the invention. The system 100 comprises a network device 105 which, for example, typically is a network switch or a router. A port 110 in the network device 105 receives network packets 115. For packets 115 that are not processed by the processor (i.e., CPU) 130, the device hardware 120 will forward the network packets 115 at high speed by typically using forwarding table lookups, so that the network device 105 can forward the packets 115 to their next destination. Alternatively, the device hardware 120 will send a packet 115 for processing by the CPU 130, if the packet 115 matches at least one of the copy rules 128 that are maintained in the device hardware 120. Note that in an alternative embodiment of the invention, only one copy rule 128 is used for comparison with the packet 115. Typically, a set of copy rules 128 is used for comparison with the packet 115. The CPU 130 is used to program the forwarding tables 127, to maintain network operation by using specific network protocols (e.g., handling route updates, ARP queries/replies, ICMP messages, spanning tree related packets, etc.), to permit user interface functionality, and to provide other functionalities that are known to those skilled in the art.

When the packet 115 matches at least one of the copy rules 128, the packet 115 is forwarded to the CPU 130 for processing. Various examples of packets that match the copy rules 128 are discussed further below. When a packet 115 is forwarded to the CPU 130, the packet 115 is denoted herein as a "copied" packet. Software 135 executing on the CPU 130 has copy rule management engine code 136 that associates each copy rule 128 with a programmable CPU queue value. Each CPU queue value is, in turn, assigned to a CPU queue. Therefore, the copy rule management engine software 136 assigns each copy rule to a particular CPU queue. Each CPU queue is typically a receive buffer in the memory space of the CPU 130.

Assume that a packet 115 is received by the device hardware 120 via port 110. A device hardware forwarding engine 125 checks the packet 115 against each of the copy rules 128, in order to determine if the forwarding engine 125 should or should not copy the packet 115 to the CPU 130. The forwarding engine 125 also determines which CPU queue should receive the packet 115, by checking the packet 115 against each copy rules 128, as discussed in detail in the examples below. In one embodiment of the invention, the CPU queue (that will receive the packet 115) is determined by the highest priority copy rule that generates a match, as discussed in additional detail in the examples below. In other words, the CPU queue that will receive the packet 115 will be the CPU queue that is associated with the matching copy rule with the highest priority (if the packet matches with multiple copy rules), or will be the CPU queue that is associated with the copy rule that matches the packet (if the packet matches with only one copy rule).

The forwarding engine 125 checks the packet header 150 to determine which forwarding lookups to perform on the packet 115. The forwarding engine 125 then uses the results of the forwarding lookups (i.e., the forwarding information 144 associated with the packet 115) and the packet header 150 in order to determine if the packet 115 matches any of the copy rules 128. The packet header 150 includes, for example, the packet type information 145, packet source and destination addresses 146, and other information associated with the packet 115. If forwarding engine 125 determines that the packet 115 does not match any of the copy rules 128, then the forwarding engine 125 will not send the packet 115 to a CPU queue, and as a result, the packet is not sent to the CPU 130 for processing. Regardless of whether or not the packet is copied to the CPU, the results 144 of the forwarding lookups are used to forward the packet out of the device 105, so that the packet 115 continues to transmit toward the eventual packet destination.

If the packet 115 matches one or more of the copy rules 128, the forwarding engine 125 will place the packet 115 into an appropriate CPU queue. As an example, assume that the CPU 130 supports 8 CPU queues (CPU queue 0 to CPU queue 7 in the example of FIG. 1). Note that the number of CPU queues supported by the CPU 130, the number of copy rules 128, and/or the reason associated with the copy rule (i.e., packet defined by the copy rule), may vary, depending on the desired functionality or functionalities in the network device 105. For example, if the network device 105 is not a router, then RULE02 (see Table 1 below) would typically not be included in the copy rules 128 because the network device would not need the route update information. The priority of each copy rule 128 may also vary or may be dynamically configurable or changeable, as discussed in one embodiment below. Additionally, in another embodiment of the invention, multiple CPUs may be implemented in a network device, as discussed below in additional detail.

In the above example, assume that there are 4 copy rules 128 which are listed in Table 1 below in priority order (from lowest priority rule to highest priority rule). Therefore, RULE00 is the lowest priority rule and RULE03 is the highest priority rule. Each of these rules is assigned to a particular CPU queue. A flagging engine 155 may also be implemented for informing the CPU 130 that a packet 115 has been placed in a CPU queue.

In the above example, the copy rules 128, the reason corresponding to the copy rule (i.e., the packet defined by each particular copy rule 128), and the assigned CPU queue for each particular copy rule 128, are shown in Table 1:

TABLE 1

| Rule: Reason |
| --- |
| RULE00: This rule is for sampled packets (used for traffic statistics gathering). RULE00 has a configured CPU queue of 1. |
| RULE01: This rule is for packets with new MAC source addresses (learns). RULE01 has a configured CPU queue of 3. |
| RULE02: This rule is for IP (Internet Protocol) route updates. RULE02 has configured CPU queue of 5. |
| RULE03: This rule is for packets indicating security violations. RULE03 has a configured CPU queue of 4. |

Note that the copy rules 128 may be reprogrammed by the copy rule management engine software 136 running on the CPU 130, so that a copy rule may be re-assigned to other CPU queues that are different from the configuration listed above in Table 1.

As an example, a received packet 115 would fire (i.e., trigger) RULE00 if the packet 115 is a sample packet, and would be sent by the forwarding engine 125 to CPU 130 on CPU queue 1 with a reason (bitmap) 160 (FIG. 1) of $0001_2$ (i.e., bit 0 of the copy rule 128 is set, indicating that RULE00 was activated). The CPU 130 will then perform the appropriate processing of the packet 115.

As another example, a received packet 115 would fire RULE01 if the packet 115 indicates a new MAC source address in the packet header 150, and would be sent by the forwarding engine 125 for buffering on CPU queue 3 and processing by the CPU 130.

As another example, a received packet 115 would fire RULE02 if the packet 115 is an IP route update, and would be sent by the forwarding engine 125 for buffering on CPU queue 5 and processing by the CPU 130. For example, the CPU 130 will parse the packet 115 so that the CPU 130 can program the hardware forwarding tables 127 to reflect the IP route update.

As another example, a packet 115 that is both a learn (has new MAC source address) and indicates security violation, would be sent by the forwarding engine 125 to the CPU 130 on CPU queue 4 with a reason of $1010_2$ (i.e., bits 1 and 3 of the reason are set, indicating that RULE01 and RULE03 were triggered). Note in this case that the packet 115 is placed in the CPU queue 4 which is the programmed queue of the highest priority matching rule, RULE03 in this example. The CPU 130 can then process the packet 115 so that a response can be generated to both the security violation and the new MAC source address.

Note also that the above copy rules 128 may be changed for detecting other packet types (i.e., the reason for a rule 128 may be changed). Additionally or alternatively, the following example copy rules may also be added for detecting other packet types:

(1) Rule that is triggered by a packet with a new IP destination address.
(2) Rule that is triggered by a packet that is addressed to the CPU 130.
(3) Rule that is triggered by a spanning tree protocol packet.
(4) Rule that is triggered by a packet related to multicasting.
(5) Rule that is triggered by another type of packet that is deemed interesting to the CPU.

In another embodiment of the invention, the copy rules 128 may be limited to include a core set of rules that will fire for packets that are used for basic network learning functions. Other variations may be implemented by the rules for detecting other particular sets of packet types.

Figure 2:
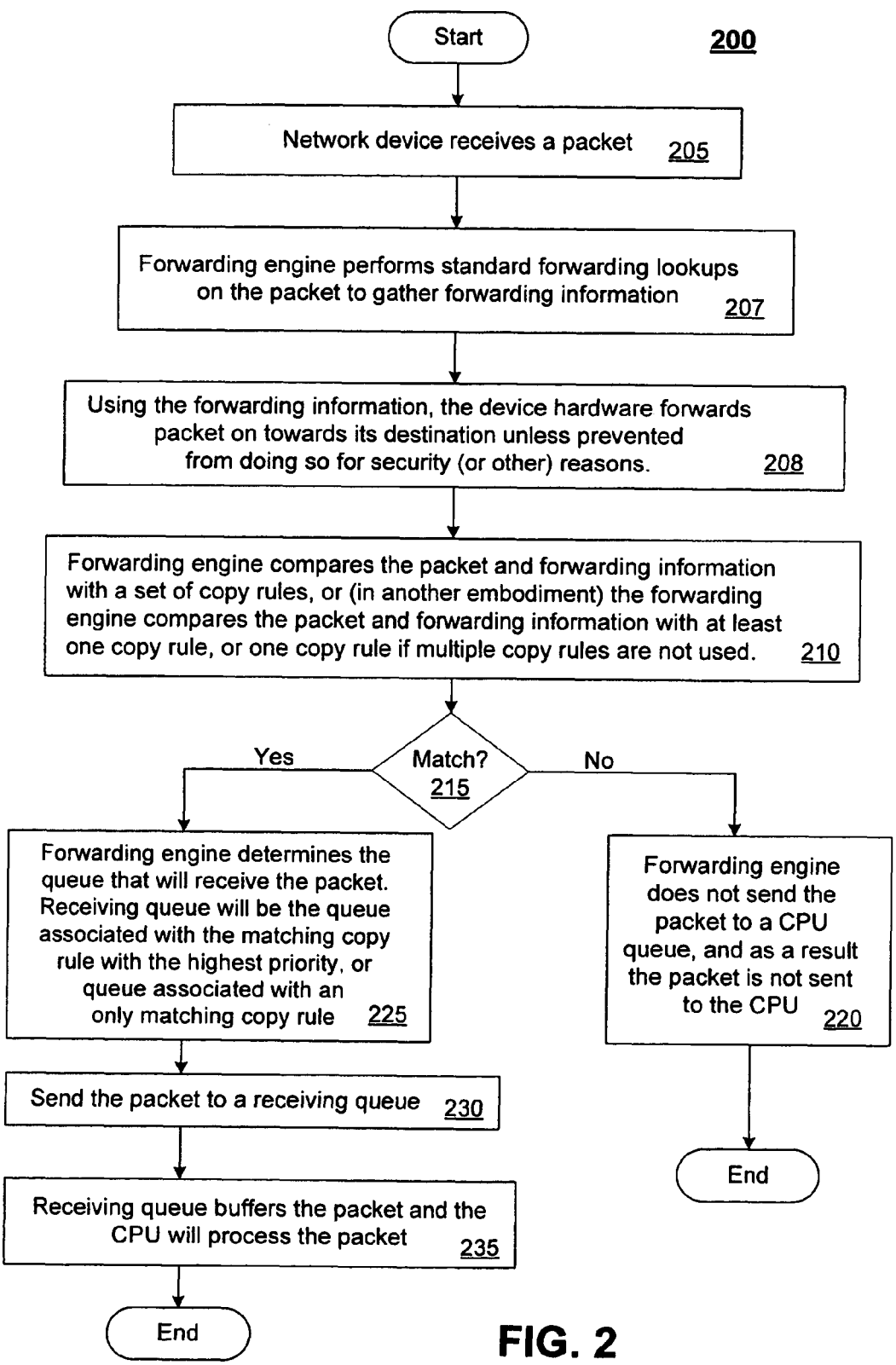
FIG. 2 is a flowchart of a method, in accordance with an embodiment of the invention.

FIG. 2 is a flowchart of a method 200, in accordance with an embodiment of the invention. The network device 105 first receives (205) a packet 115. The forwarding engine 125 performs (207) a standard set of forwarding lookups on the packet to gather the forwarding information 144. The forwarding information 144 is used (208) to forward the packet 115 on towards its destination, providing it is permitted to be forwarded. Note that the network device 105 may prevent forwarding a packet to its destination due to, for example, security or other reasons. The forwarding engine 125 then compares (210) the packet 115 and associated forwarding information 144 with a set of copy rules 128, or (in another embodiment) the forwarding engine 125 compares (210) the packet 115 and associated forwarding information 144 with at least one copy rule, or one copy rule if multiple copy rules are not used. Therefore, in one embodiment, only one copy rule may be used for comparing with the packet 115. Typically, a plurality of copy rules is used for comparing with the packet 115.

In block 215, the forwarding engine 125 determines if the packet 115 matches at least one of the copy rules 128 or does not match any of the copy rules 128. Specifically, in block 215, the packet information and the forwarding information 144 associated with the packet 115 are compared with each of the copy rules 128 to determine if a match results with any of the copy rules 128.

If the packet 115 does not match any of the copy rules 128, then in block 220, the forwarding engine 125 will not send the packet 115 to a CPU queue, and as a result, the packet is not sent to the CPU 130 for processing.

On the other hand, if the packet 115 matches at least one of the copy rules 128, then in block 225, the forwarding engine 125 determines the CPU queue that will receive the packet 115. In one embodiment of the invention, the CPU queue that will receive (buffer) the packet 115 will be the CPU queue that is associated with the matching copy rule with the highest priority (if the packet matches with multiple copy rules), or will be the queue that is associated with the copy rule that matches with the packet (if the packet matches with only one copy rule).

In block 230, the forwarding engine 125 will send the packet 115 to a receiving CPU queue. In block 235, the receiving CPU queue will buffer the packet 115, and the CPU 130 will process the packet 115.

Re-Prioritization of Copy Queues (Copy Queues are Dynamically Configurable):

If the situation exists where many security violations are occurring and the CPU 130 is in the situation of being overrun by such packet traffic, then the CPU 130 can reprogram the CPU queue for RULE03 (CPU queue 4 in this example) with a lower CPU queue (e.g., CPU queue 0). The CPU 130 will reassign RULE03 from the higher CPU queue 4 to the lower CPU queue 0, in this example. At this point, any further packets 115 indicating a security violation will be placed in the lower CPU queue 0, so that the CPU functionality is not degraded. As a result, security violations are downgraded, while still allowing other packet types that are not security violations (e.g., sample packets (which fire RULE00), packets with new MAC source addresses (which fire RULE01) and IP route updates (which fire RULE02)), to be correctly queued in higher priority CPU queues than the packets indicating security violations which are queued at lower CPU queues (e.g., CPU queue 0). Note that the priority of RULE03 continues to be 3, and thus packets matching RULE03 and any other lower priority rule will still be sent to CPU queue 0 and not the CPU queue assigned to any lower priority rule. This feature of dynamically changing the CPU queue of the copy rules 128 permits the network and switch or router integrity to be better maintained in abnormal traffic scenarios.

In an embodiment of the invention, if a predetermined high rate of packets 115 is received by the CPU 130 for a particular copy rule (e.g., RULE03), then the copy rule management engine software 136 can reprogram the copy rules 128 such that the CPU queue assigned to the particular copy rule is dynamically changed. In the specific example above, if the rate or number of security violations reaches a predetermined threshold value, then the CPU queue assigned to RULE03 will be reduced to a lower priority CPU queue (e.g., the copy rule management engine software 136 reprograms the copy rules 128 such that RULE03 is no longer assigned the higher CPU queue 4 and is instead assigned a lower CPU queue (e.g., CPU queue 0)).

As an example, the particular copy rule is assigned the lowest CPU queue for a predetermined period of time. Therefore, in this example, if the predetermined period of time has passed, then the copy rule management engine software 136 again reprograms the RULE03 to its original CPU queue (e.g. CPU queue 4).

A simple method of implementing such an adaptive system involves measurement of the rate of arrival of packets associated with each copy rule 128 at the CPU 130. This can be implemented using a leaky-bucket algorithm, whereby tokens are added to a bucket (variable maintained in software) at a fixed rate (e.g., 100 per second, subject to some maximum value), and are removed every time the CPU receives a packet associated with a particular copy rule. If the CPU 130 receives a packet for a copy rule for which no tokens are available, then this indicates that the set rate has been exceeded and the CPU queue assigned to the rule in question needs to be reduced. Once the number of tokens in the bucket has built up to a pre-determined level (typically non-zero, such that hysteresis is present in the system), then the CPU queue assigned to the rule in question can be restored to its original value.

In a typical embodiment, the CPU queue assigned to each copy rule exists in the table of copy rules 128, and this portion of the table is writeable by the CPU 130.

A bit-map 160 (FIG. 1) of the copy rule(s) that has (have) triggered is also sent by the forwarding engine 125 to the CPU 130 (along with the packet), in order to simplify the packet processing by the CPU 130. As known to those skilled in the art, a bit-map is collection of data represented as an array of bits. The CPU 130 can count the rate at which a particular copy rule has triggered, based upon the number of times a bit for each rule is set in the bit-maps 160 that are received by the CPU 130.

Note that other criteria could be used by the CPU 130 in order to restore the default priority of a copy rule 128 when the criteria is satisfied. These other criteria include, but are not limited to the following:

(1) Restore the default copy rule priority based on a time period having passed, as mentioned above.
(2) Restore the default copy rule priority based on a period of good packet behavior (i.e., packets that trigger a particular copy rule are no longer being received by the CPU 130 above a predetermined threshold value).
(3) Restore the default copy rule priority if the CPU is no longer executing a large number of tasks.
(4) Restore the default copy rule priority based upon another criteria.

Re-Prioritization of Copy Rules (Copy Rules are Dynamically Configurable):

If the situation exists where the original copy rule priority is not meeting current user needs, then the CPU 130 can reprogram the priority of the copy rules 128. For example, if a user is less concerned with security violations (RULE03) but more concerned with new MAC source addresses (RULE01), then the CPU 130 can reprogram the priority of RULE01 to be higher than that of RULE 03. In this case, the new rule priority ordering (from lowest priority to highest priority) would become RULE00, RULE02, RULE03 and RULE01. In order to change the priority of a copy rule 128 (i.e., in order to increase or decrease the copy rule priority), the CPU 130 would change the variables associated with the priority values of the copy rules 128. In this case, any further packets 115 indicating a new MAC source address will trigger RULE01 and be copied to the CPU 130 on the CPU queue assigned to RULE01. As RULE01 is now the highest priority rule, packets 115 that match RULE01 and any of the other rules (RULE00, RULE02, RULE03) will still be copied using the CPU queue assigned to RULE01 as this is now the highest priority rule.

Such dynamic configuration of the copy rules 128 by the CPU 130 allows the network device 105 to remain flexible within a wide range of network environments and customer needs.

Figure 3:
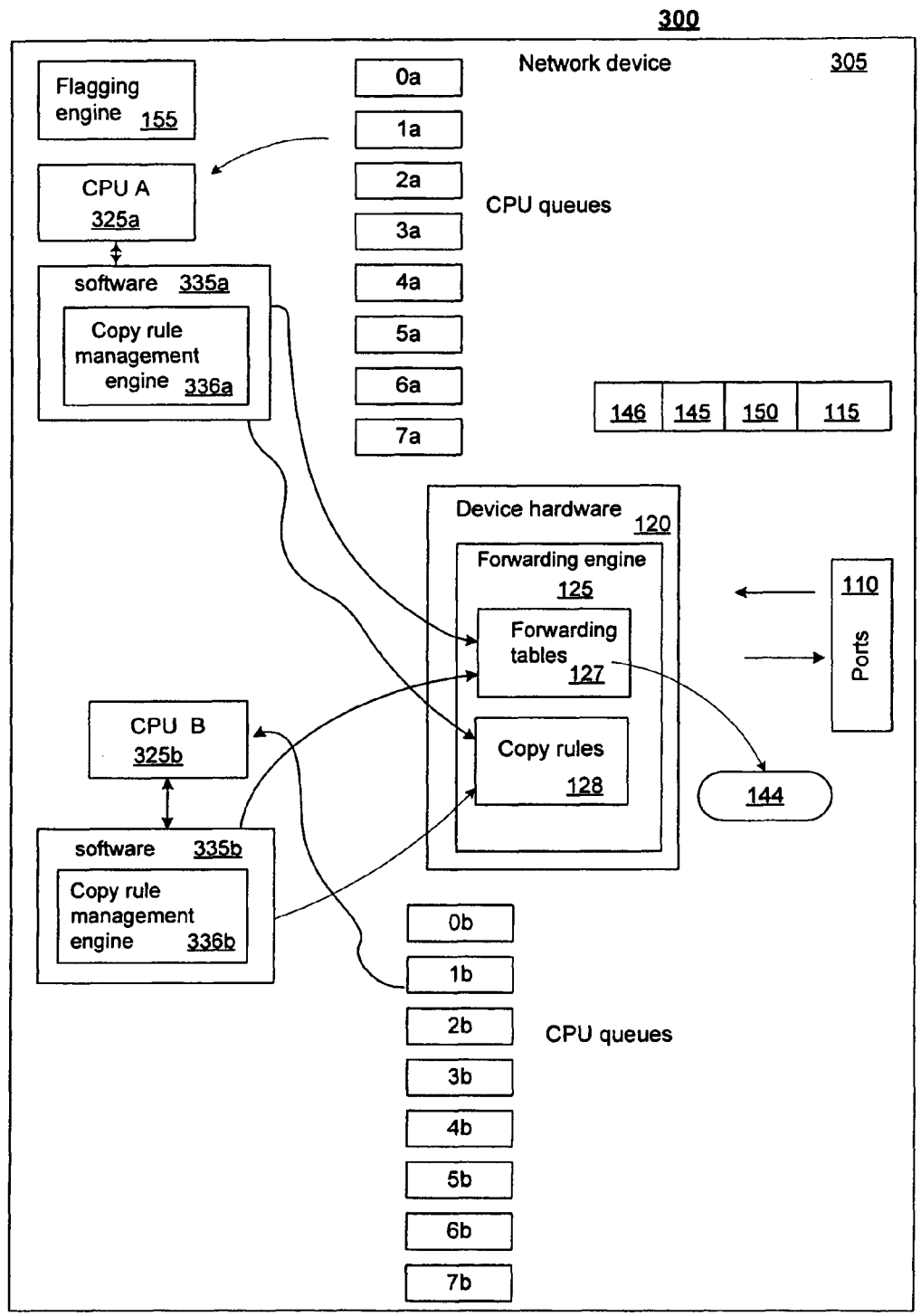
FIG. 3 is a block diagram of a system (apparatus), in accordance with another embodiment of the invention.

Multiple CPUs, with Independent Queues for each CPU (Copy Location):

FIG. 3 is a block diagram of a system (apparatus) 300, in accordance with another embodiment of the invention, where a network device 305 includes multiple CPUs 325a and 325b. Note that the number of CPUs may vary in number, where N is a suitable integer value. Each CPU controls its own set of queues. For example, CPU (A) 325a controls the queues 0a through 7a, and CPU (B) 325b controls the queues 0b through 7b. The number of queues controlled by each CPU may vary in number.

The forwarding engine 125 checks the packet header 150 and the results 144 of the forwarding lookups, in order to determine if the packet 115 matches any of the copy rules 128. If the packet 115 matches one or more of the copy rules 128, the forwarding engine 125 will place the packet 115 into an appropriate queue. The copy rule management engine 336a in software 335a executing on CPU 325a assigns a particular set of the copy rules 128 (e.g., RULES 00 and 01 or other copy rules) to the CPU queues 0a-7a. The copy rule management engine 336b in software 335b executing on CPU 335b assigns another particular set of copy rules 128 (e.g., RULES 02 and 03 or other copy rules) to the CPU queues 0b-7b. If the packet 115 matches a copy rule that is assigned to one of the CPU queues 0a-7a, then the packet 115 is buffered in one of the CPU queues 0a-7a and then processed by the CPU 325a. On the other hand, if the packet 115 matches a copy rule that is assigned to one of the CPU queues 0b-7b, then the packet 115 is buffered in one of the CPU queues 0b-7b and then processed by the CPU 325b. It is also possible for a copy rule to be assigned to more than one CPU, for example a copy rule can be assigned to one of the queues 0a-7a for CPU 325a and also to one of the queues 0b-7b for CPU 325b. In this case, both CPU 325a and CPU 325b will receive a copy of the packet for processing. Note that in this case, the queues assigned to each CPU do not have to be identical, for example, a single packet 115 can be copied to CPU queue 3a of CPU 325a and also to CPU queue 7b of CPU 325b.

Also, typically one CPU (e.g., CPU 325a) would manage the device hardware 120, while another CPU (e.g., CPU 325b) could send messages to CPU 325a in order to instruct the CPU 325a to reprogram the CPU queues (i.e., re-prioritize the copy queues) or to reprogram the copy rule priorities (i.e., re-prioritize the copy rules), or to change other configurations.

Designation of Particular CPUs to Processing of Specific Packet Traffic Types:

In another embodiment of the invention, in the network device 305 of FIG. 3 with the multiple CPUs, each CPU can be designated to the processing of specific traffic types. Therefore, CPU 325a will process one or more specific traffic types, while CPU 325b will process one or more other specific traffic types. Thus, in addition to queue assignment, the copy rule management engines 336a and 336b will assign each of the copy rules to one or more of the CPUs 325a and 325b. For example, the engine 336a assigns RULE00 and RULE03 to CPU 325a and the engine 336b assigns RULE01 through RULE03 to CPU 325b. Other example assignments of copy rules are possible. Therefore, if the packet 115 matches with the reason in RULE00, then the forwarding engine 125 will buffer the packet 115 in one of the queues 0a-7a for CPU 325a. If the packet matches with at least one of RULE01 or RULE02, then the forwarding engine 125 will buffer the packet 115 in a particular one of the queues 0b-7b for CPU 325b. If the packet matches with RULE03, then the forwarding engine 125 will buffer the packet 115 in a particular one of the queues 0a-7a for CPU 325a and also in a particular one of the queues 0b-7b for CPU 325b. The copy rules 128 can be dynamically programmed by the software 335a and 335b so that the copy rules 128 are assigned to different CPUs and/or different queues. This embodiment permits a very efficient technique and increased robustness for the processing of packet traffic in a distributed CPU system.

Figure 4:
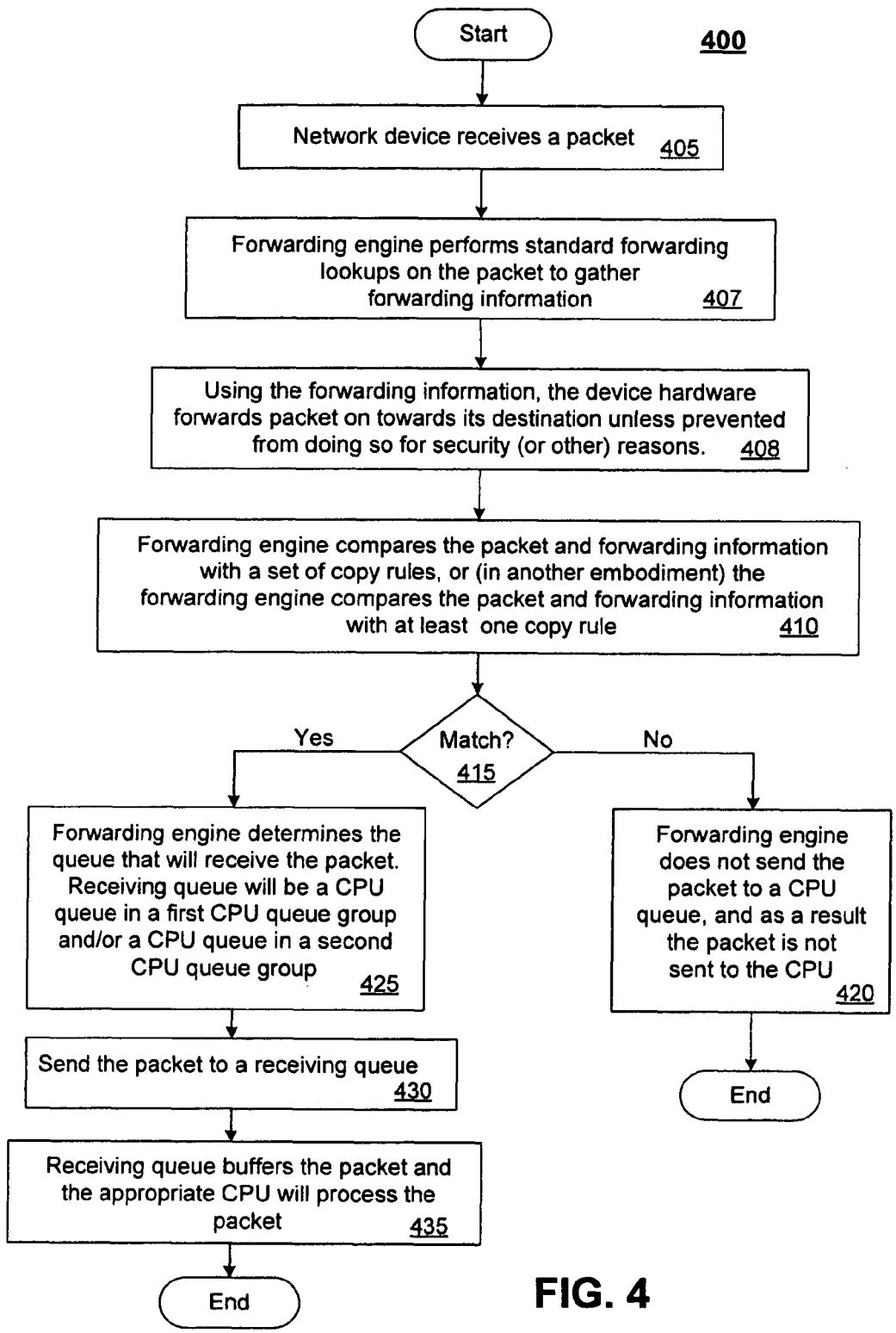
FIG. 4 is a flowchart of a method, in accordance with another embodiment of the invention.

FIG. 4 is a flowchart of a method 400, in accordance with another embodiment of the invention. The network device 105 first receives (405) a packet 115. The forwarding engine 125 performs (407) a standard set of forwarding lookups on the packet to gather the forwarding information 144. The forwarding information 144 is used (408) to forward the packet 115 on towards its destination, providing it is permitted to be forwarded. Note that the network device 105 may prevent in forwarding a packet to its destination due to, for example, security or other reasons. The forwarding engine 125 then compares (410) the packet 115 and associated forwarding information 144 with a set of copy rules 128, or (in another embodiment) the forwarding engine 125 compares (410) the packet 115 and associated forwarding information 144 with at least one copy rule, or one copy rule if multiple copy rules are not used.

In block 415, the forwarding engine 125 determines if the packet 115 matches at least one of the copy rules 128 or does not match any of the copy rules 128. Specifically, in block 415, the packet information and the forwarding information 144 associated with the packet 115 are compared with each of the copy rules 128 to determine if a match results with any of the copy rules 128.

If the packet 115 does not match any of the copy rules 128, then in block 420, the forwarding engine 125 will not send the packet 115 to a CPU queue, and as a result, the packet is not sent to the CPU 130 for processing.

On the other hand, if the packet 115 matches at least one of the copy rules 128, then in block 425, the forwarding engine 125 determines the CPU queue that will receive the packet 115. In one embodiment of the invention, the CPU queue that will receive (buffer) the packet 115 will be a CPU queue in a first CPU queue group (e.g., CPU queues 0a-7a in the FIG. 3 example) and/or a CPU queue in a second CPU queue group (e.g., CPU queues 0b-7b).

In block 430, the forwarding engine 125 will send the packet 115 to a receiving CPU queue (or queues). In block 435, the receiving CPU queue (or queues) will buffer the packet 115, and the appropriate CPU (or CPUs) will process the packet 115.

An embodiment of the invention improves classification accuracy for packets that are sent to a CPU for further processing. This increased classification accuracy results in two main benefits: (1) more important packets are processed quickly, thus reducing the latency associated with important operations, (2) more important packets are processed at the expense of less important packets, thus reducing the probability that a more important packet will not get processed in an overloaded system. This is vital to maintaining network and switch or router robustness during, for example, high-traffic situations or during denial of service (DoS) type attacks.

In another embodiment of the invention, an apparatus for prioritizing network packets, includes a network device configured to compare a packet with a set of copy rules, wherein the network device buffers the packet in a first queue prior to processing by a first processor, if the packet matches a first copy rule, and wherein the network device buffers the packet in a second queue prior to processing by a second processor, if the packet matches a second copy rule.

In another embodiment of the invention, an apparatus for prioritizing network packets, includes means for comparing a packet with at least one copy rule, and means for buffering the packet in a queue, if the packet matches the copy rule.

In another embodiment of the invention, an article of manufacture, includes a machine-readable medium having stored thereon instructions to: compare a packet with at least one copy rule; and buffer the packet in a queue, if the packet matches the copy rule.

Various elements in the drawings may be implemented in hardware, software, firmware, or a combination thereof.

The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for prioritizing network packets, the method comprising:
   comparing a packet of the network packets with at least one copy rule;
   if the packet matches the copy rule, then buffering the packet in a queue, wherein the queue that buffers the packet is associated with a matching copy rule with a highest priority among multiple copy rules, if the packet matches with the multiple copy rules;
   dynamically changing the queue assigned to the matching copy rule from a highest queue value to a lower queue value if the network packets trigger the matching copy rule at a predetermined threshold rate; and restoring the queue assigned to the matching copy rule to its original queue value after a predetermined period of time.

2. The method of claim 1, further comprising:
processing the packet after buffering the packet in the queue.

3. The method of claim 1, further comprising:
prior to comparing the packet with the at least one copy rule, receiving the packet by a network device.

4. The method of claim 3, wherein the network device comprises a network switch.

5. The method of claim 3, wherein the network device comprises a router.

6. The method of claim 1, wherein the copy rule is assigned a CPU queue.

7. The method of claim 1, further comprising:
sending a bit-map with the packet that is buffered in the queue.

8. The method of claim 1, wherein the queue that will buffer the packet will be the queue that is associated with the copy rule that matches with the packet, if the packet matches with only one copy rule.

9. The method of claim 1, wherein the at least one copy rule is associated with a reason comprising one of: a sampled packet used for traffic profiling, a packet with new MAC source address, Internet Protocol route update, a packet indicating a security violation, a packet that is addressed to a processor, a spanning tree protocol packet, a packet related to multicasting, or another type of packet.

10. The method of claim 1 wherein the act of comparing the packet with at least one copy rule comprises:
comparing forwarding information associated with the packet and packet information of the packet with the at least one copy rule.

11. The method of claim 1, further comprising:
changing a priority of a copy rule, so that the priority is increased or decreased.

12. The method of claim 11, wherein changing the priority of the copy rule will change an order of priorities of the copy rules.

13. A method for prioritizing network packets, the method comprising:
comparing a packet with a set of copy rules;
if the packet matches a first copy rule, then buffering the packet in a first queue prior to processing by a first processor;
if the packet matches a second copy rule, then buffering the packet in a second queue prior to processing by a second processor; and
changing a priority value of the first queue associated with the first copy rule to a lower priority value if the network packets trigger the first copy rule at a predetermined threshold rate.

14. The method of claim 13, further comprising:
processing the packet by the first processor, after buffering the packet in the first queue.

15. The method of claim 13, further comprising:
processing the packet by the second processor, after buffering the packet in the second queue.

16. The method of claim 13, further comprising:
prior to comparing the packet with the copy rules, receiving the packet by a network device.

17. The method of claim 16, wherein the network device comprises a network switch.

18. The method of claim 16, wherein the network device comprises a router.

19. The method of claim 13, further comprising:
sending a bit-map with the packet that is buffered in a queue.

20. The method of claim 13, wherein the at least one copy rule is associated with a reason comprising one of: a sampled packet used for traffic profiling, a packet with new MAC source address, Internet Protocol route update, a packet indicating a security violation, a packet that is addressed to a processor, a spanning tree protocol packet, a packet related to multicasting, or another type of packet.

21. The method of claim 13, further comprising: if the packet matches a first copy rule, then buffering the packet in the first queue and in the second queue.

22. The method of claim 13 wherein the act of comparing the packet with the set of copy rules comprises:
comparing forwarding information associated with the packet and packet information of the packet with the set of copy rules.

23. The method of claim 13, further comprising:
changing a priority of a copy rule, so that the priority is increased or decreased.

24. The method of claim 23, wherein changing the priority of the copy rule will change an order of priorities of the copy rules.

25. An apparatus for prioritizing network packets, the apparatus comprising:
a network device configured to compare a packet of the network packets with at least one copy rule;
wherein the network device is configured to buffer the packet in a queue if the packet matches the copy rule and, if the packet matches with multiple copy rules, the queue that buffers the packet is associated with a matching copy rule with a highest priority among the multiple copy rules;
dynamically changing the queue assigned to the matching copy rule from a highest queue value to a lower queue value if the network packets trigger the matching copy rule at a predetermined threshold rate; and
restoring the queue assigned to the matching copy rule to its original queue value after a predetermined period of time.

26. The apparatus of claim 25, wherein the network device further comprising a processor configured to process the packet after buffering the packet in the queue.

27. The apparatus of claim 26, wherein the network device comprises a network switch.

28. The apparatus of claim 26, wherein the network device comprises a router.

29. The apparatus of claim 26, wherein the copy rule is assigned a CPU queue.

30. The apparatus of claim 26, wherein the network device is configured to send a bit-map with the packet that is buffered in the queue.

31. The apparatus of claim 26, wherein the queue that will buffer the packet will be the queue that is associated with the copy rule that matches with the packet, if the packet matches with only one copy rule.

32. The apparatus of claim 26, wherein the at least one copy rule is associated with a reason comprising one of: a sampled packet used for traffic profiling, a packet with new MAC source address, Internet Protocol route update, a packet indicating a security violation, a packet that is addressed to a processor, a spanning tree protocol packet, a packet related to multicasting, or another type of packet.

33. An apparatus for prioritizing network packets, the apparatus comprising:
  a network device to compare a packet with a set of copy rules;
  wherein the network device buffers the packet in a first queue prior to processing by a first processor, if the packet matches a first copy rule;
  wherein the network device buffers the packet in a second queue prior to processing by a second processor, if the packet matches a second copy rule; and
  wherein the network device is further to change a priority value of the first queue associated with the first copy rule to a lower priority value if the network packets trigger the first copy rule at a predetermined threshold rate.

34. An apparatus for prioritizing network packets, the apparatus comprising:
  means for comparing a packet of the network packets with at least one copy rule;
  means for buffering the packet in a queue, if the packet matches the copy rule, wherein, if the packet matches with multiple copy rules, the queue that buffers the packet is associated with a matching copy rule with a highest priority among the multiple copy rules;
  means for dynamically changing the queue assigned to the matching copy rule from a highest queue value to a lower queue value if the network packets trigger the matching copy rule at a predetermined threshold rate; and
  means for restoring the queue assigned to the matching copy rule to its original queue value after a predetermined period of time.

35. An article of manufacture, comprising:
  a storage device having stored thereon instructions to:
  compare a packet with at least one copy rule; and
  buffer the packet in a queue, if the packet matches the copy rule, wherein, if the packet matches with multiple copy rules, the queue that buffers the packet is associated with a matching copy rule with the highest priority among the multiple copy rules;
  dynamically change the queue assigned to the matching copy rule from a highest queue value to a lower queue value if the network packets trigger the matching copy rule at a predetermined threshold rate; and
  restore the queue assigned to the matching copy rule to its original queue value after a predetermined period of time.

* * * * *